United States Patent
Eble et al.

(10) Patent No.: US 9,791,658 B2
(45) Date of Patent: Oct. 17, 2017

(54) OPTICAL MODULE AND METHOD FOR PRODUCING AN OPTOELECTRONIC SENSOR

(71) Applicant: SICK AG, Waldkirch (DE)

(72) Inventors: Johannes Eble, Waldkirch (DE); Sebastian Matt, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 14/506,716

(22) Filed: Oct. 6, 2014

(65) Prior Publication Data

US 2015/0103425 A1    Apr. 16, 2015

(30) Foreign Application Priority Data

Oct. 11, 2013 (DE) .......... 10 2013 111 255

(51) Int. Cl.
  G02B 7/02 (2006.01)
  G01V 8/20 (2006.01)
  G02B 3/00 (2006.01)
  G01J 1/04 (2006.01)

(52) U.S. Cl.
  CPC ........... *G02B 7/021* (2013.01); *G01J 1/0403* (2013.01); *G01V 8/20* (2013.01); *G02B 3/0075* (2013.01); *Y10T 29/49826* (2015.01)

(58) Field of Classification Search
  CPC ........ G03B 17/14; G02B 7/02; G02B 23/125; G02B 7/021
  USPC .................. 359/827, 828, 819, 818, 815, 811
  See application file for complete search history.

(56) References Cited

U.S. PATENT DOCUMENTS

| | | | |
|---|---|---|---|
| 7,417,805 B2 | 8/2008 | Chang | |
| 9,310,571 B2* | 4/2016 | Hung | G02B 6/4214 |
| 2006/0114578 A1* | 6/2006 | Nakajima | G02B 7/021 |
| | | | 359/811 |
| 2008/0130144 A1 | 6/2008 | Chang | |
| 2009/0141164 A1* | 6/2009 | Moon | G03B 15/05 |
| | | | 348/371 |
| 2010/0247086 A1* | 9/2010 | Tallaron | G02B 3/14 |
| | | | 396/133 |

FOREIGN PATENT DOCUMENTS

| | | |
|---|---|---|
| DE | 102006019717 A1 | 10/2007 |
| EP | 1180697 B1 | 3/2004 |
| JP | 09284617 A | 10/1997 |
| KR | 100854748 B1 | 8/2008 |
| WO | 2010111465 A1 | 9/2010 |

* cited by examiner

*Primary Examiner* — Dawayne A Pinkney
(74) *Attorney, Agent, or Firm* — Nath, Goldberg & Meyer; Jerald L. Meyer (57) ABSTRACT

An optical module (10) having at least one beam-forming element (14) and having at least two retainer brackets (20) for fastening the optical module (10) to a carrier (30) are provided. In this connection the retainer brackets (20) have a first support element (22a) at a first spacing with respect to the lens (14) and a second support element (22b) at a second spacing different from the first spacing with respect to the beam-forming element (14) in order to selectively fasten the optical module (10) to the carrier (30) at the first spacing or at the second spacing.

15 Claims, 5 Drawing Sheets

OPTICAL MODULE AND METHOD FOR PRODUCING AN OPTOELECTRONIC SENSOR

The invention relates to an optical module comprising at least one beam-forming element and to a method for the manufacture of an optoelectronic sensor in accordance with the preamble of the respective independent claim respectively.

Such an optical module serves the purpose of positioning the beam-forming element, frequently configured as a lens, with respect to a different element, such as a radiation source or a reception element. The optical module frequently includes a lens tube besides the lens which shades internal light paths between the lens and the light transmitter and/or the light receiver.

An example for a system in which the optical modules are used is an optoelectronic sensor. Light barriers which work according to the principle of transmitting a light beam, of registering this in a light receiver, and of evaluating whether the received signal exceeds a switching threshold or not are used for this purpose. In a light grid a plurality of light barriers is effectively combined in parallel to one another, wherein then naturally parts of the switching electronics can be commonly used by a plurality of beams. It is known to assemble light grids in a modular manner which is expressed in particular on the use of optical modules having a plurality of lenses for a plurality of beams lying next to one another.

The accuracy of the positioning of the optical module at its carrier, for example, a circuit board having transmission or reception elements, plays a central role for the performance of such a system. For example, the maximum range changes for a change in position of the optical module. Correspondingly, the desire exists to minimize the tolerances in position. At the same time, an as stable as possible connection without tolerance is desired in order to be robust with respect to outer influences, such as oscillations or shocks, and to continuously ensure a reliable operation.

It is known to fasten an optical module by means of diverse connection technologies. Screwing, adhesively bonding, cold press fitting, hot press fitting or clipping can be carried out for this purpose. The screwing or adhesively, bonding however requires a joining process demanding in effort and cost during its manufacture, whereas during press fitting or clipping, these partly do not achieve a sufficient accuracy of positioning, albeit process qualifications demanding in effort and cost.

The EP 1 180 697 B1 describes an apparatus for the generation of a light curtain, in which the optical modules having a plurality of lens tubes are snapped into place in corresponding recesses at a circuit board by means of projections.

In the DE 10 2005 046 359 A1 two flexible hooks are formed at a lens tube by means of which a transparent plastic housing is held in which a light transmitter or light receiver module is ingrained.

From the DE 10 2006 019 717 A1 an optical module is known which is snapped into place at a circuit board with the aid of snap hooks and centering pins.

However, these solutions do not consider that, due to optical boundary conditions and predefined sizes of the transmission and reception components, different lens spacings are required in practice at the transmission side and at the receiver side. A common optical module can only be fastened in one way and in this way only with a single lens spacing that is fixed. If one wants to vary the spacing then one has to use a different optical module having a different height.

For this reason it is the object of the invention to create a reliable fastening for an optical module as a carrier which at the same time is more flexible.

This object is satisfied by an optical module comprising a beam-forming element and by a method for the manufacture of an optoelectronic sensor in accordance with the respective independent claim. In this connection the invention starts from the basic idea of fastening the optical module by means of retainer brackets which at least have two support elements or support surfaces at different levels. Thereby the optical module can be used as a multi-functional bracket in that selectively the one or the other support element is supported at the carrier. The different heights of the support elements thus each lead to a respectively precisely defined spacing of the beam-forming element with respect to the carrier and in particular to light transmitters or light receivers at the carrier. The beam-forming element is frequently a lens and for this reason will be referred to as such in the following, however, can, for example, also be a different refractive element, diffractive element or reflexive element and/or a combination of such elements. In this connection the spacing relates to the relevant z-direction which coincides with the optical axis of the lens. When there is talk of the spacing of the optical module with respect to the carrier, the lens spacing is generally contemplated therewith, since the optical module itself has to come into contact with the carrier for the fastening.

In a different important case of application of the optical module the carriers to which the optical module is fastened, differ from one another in order to respectively utilize the suitable support element. For example, a carrier and/or a circuit board having reception elements is configured differently than a carrier with transmission elements in such a way that the transmission side and the receiver side lens spacing can differ. In contrast thereto the optical module remains the same, it is merely fastened once on use of the first support elements and is fastened once on the use of the second support elements.

The invention has the advantage that the same optical module is suitable for the positioning of the lens at different spacings. In this connection these spacings are set with a high accuracy of positioning, whereby increased ranges can be achieved. Moreover, the assembly of the optical module remains simple and fast and in this way cost-effective. The connection without clearance ensures a high resistance with respect to oscillation effects and shock effects.

The retainer brackets are preferably configured with undersize and are brought into their holding position on an introduction of force in order to overcome the lack in size. Thereby, the retainer brackets in the installed state are biased after the introduction of force has ended in order to ensure a connection in the z-direction without clearance. By means of the undersize the connection differs from a simple clip-on connection and secures a precise mounting which is free of clearance.

The optical module preferably has a plurality of stubs in order to define the lateral position of the optical module at the carrier through an engagement in corresponding recesses at the carrier. In this connection, lateral means the x- and y-directions perpendicular to the z-direction defined by the optical axis of the lens. The corresponding high lateral accuracy of positioning of the optical module relative to the carrier, for example, in a light grid, ensures a more exact beam pattern, a smaller squint angle between adjacent beams, a more exact angle of availability and an increased range. Moreover, further improved system properties result, in particular in connection with the precisely set spacing in the z-direction, such as an increased mirroring strength, a smaller cycling time for the common sequential activation of the individual beams of the light grid, an expanded use as a crossed beam and a reduced minimum spacing with respect to a different light grid.

The stubs preferably have a first part region and a second part region and the engagement in the recess on the fastening of the optical module at the first spacing and at the second spacing is determined by the part regions. For this purpose, the carrier preferably provides a recess, for example, a bore hole of a certain diameter which selectively only comes into engagement with only one transition defined by the two part regions. In this way also the stubs serve the purpose, besides the support elements, of setting the two different spacings between the lens and the carrier.

The optical module preferably has at least one lens tube. The lens tube serves the optical screening with respect to scattered light which is not incident on the lens.

The beam-forming element and/or the lens and the lens tube are preferably connected to one another in a releasable manner. This simplifies the separate manufacture of the two components lens and lens tube of the optical module. A releasable connection, for example, a snap-on connection can be handled in an improved manner with respect to adhesively bonding or a different kind of connection. However, also a fixed connection is alternatively plausible, for example, by means of two component injection molding.

The beam-forming elements of the optical modules preferably form an array of lenses. Then the optical module can be used in an array sensor, in particular as a line arrangement in a light grid. The optical module preferably also has an array of lens tubes which pairwise associates lenses and lens tubes with respect to one another in accordance with the array of lenses. In this connection, a direct correspondence of lenses and lens tubes is not necessary, for example, also a more dense array of lenses can principally be used of which then only each second lens is used and the associated array of lens tubes correspondingly only includes half as many lens tubes.

The optical module preferably forms an arrangement having a carrier which has at least two support sections at which the first support element of a retainer bracket is respectively supported or which has at least two support sections at which the second support element of a retainer bracket is respectively supported. The carrier respectively used in the arrangement differs in its support section depending on what spacing the optical module of the lens should maintain. For example, a counter sink of a circuit board at which, depending on the case, the first support element or the second element lies serves as a support section. In principle, it is also plausible that the same carrier provides both kinds of support elements and uses the support elements suitable for the fastening of the optical module at the desired spacing.

The carrier preferably has a plurality of recesses which are respectively configured for the engagement of the first part region of a stub or are each configured for the engagement of the second part region of a stub. The recesses, for example, bore holes of different diameter are configured like the support elements in this connection, such that the optical module can be fastened correspondingly at the first spacing or at the second spacing in a targeted manner.

The carrier preferably has at least one light transmitter or at least one light receiver. Typically, a different lens spacing is required at the receiver side than at the transmitter side and this is achieved by the optical module configured for the fastening at one of two spacings.

In a preferred embodiment a light barrier or a light grid is provided which has at least one arrangement in accordance with the invention. A transmission module having a carrier, which has one or more light transmitters and an optical module fastened at the first spacing is in particular provided therein, as well as a receiver module having a carrier which has one or more light receivers and an optical module fastened at the second spacing is provided.

During the manufacturing method in accordance with the invention an optical module, in particular an optical module in accordance with one of the described embodiments is fastened to a carrier which is preferably configured by means of the design of its support sections for the fastening of the optical module at the first spacing or at the second spacing.

In this connection stubs of the optical module are preferably guided for the determination of the lateral position of the optical module at the carrier in recesses of the carrier, wherein selectively a first part region or a second part region of the stub engages in correspondingly configured recesses for the first part region or the second part region and the first spacing or the second spacing can thereby be set again. The stubs and recesses are thus coordinated with respect to the same spacings as the support elements and the support sections.

The invention will be described in the following also with regard to further features and advantages by way of example by means of embodiments and with reference to the submitted drawing. The images of the drawing show in.

Figure 8:
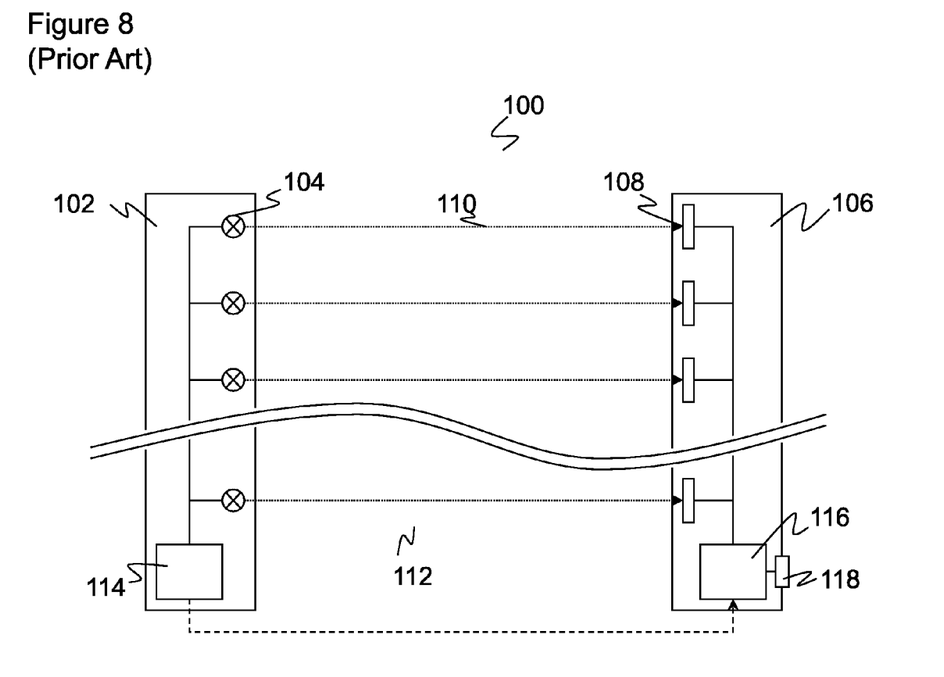
FIG. 8 a schematic sectional illustration of a common light grid.

FIG. 8 shows a simplified sectional illustration through a common light grid 100. A transmission unit 102 having a plurality of light transmitters 104 and a reception unit 106 having a plurality of light receivers 108 are arranged disposed opposite one another. A light beam 110 is respectively transmitted to an associated light receiver 108 by the light transmitter 104. Thus, the light grid 100 has a plurality of light beams 110 in order to recognize objects in a monitored zone 112 between the transmission unit 102 and the reception unit 106.

A transmission control is provided in the transmission unit 102 in order to control the activity of the light transmitter 104. An evaluation unit 116 is provided as a counter-piece in the reception unit 106 in order to evaluate the received signals. With reference to the received signals the evaluation unit 116 recognizes which light beams 110 are interrupted and which are not.

During the manufacture of such a light grid 100 optics have to be arranged at the light transmitter 104 and at the light receivers 108. Such optics typically comprise at least one collection lens in order to generate a collimated light beam 110 at the transmission side and to bunch this at the reception side. A further frequently used element of the optics is a lens tube which forms a kind of guide or a funnel of optically opaque material and thus outwardly screens the internal optical path between lens and light transmitter 104 or light receiver 108 respectively. Such optics are mounted with the aid of optical modules, wherein a plurality of optics can be combined in an optical module for a simplified manufacture.

Figure 1:
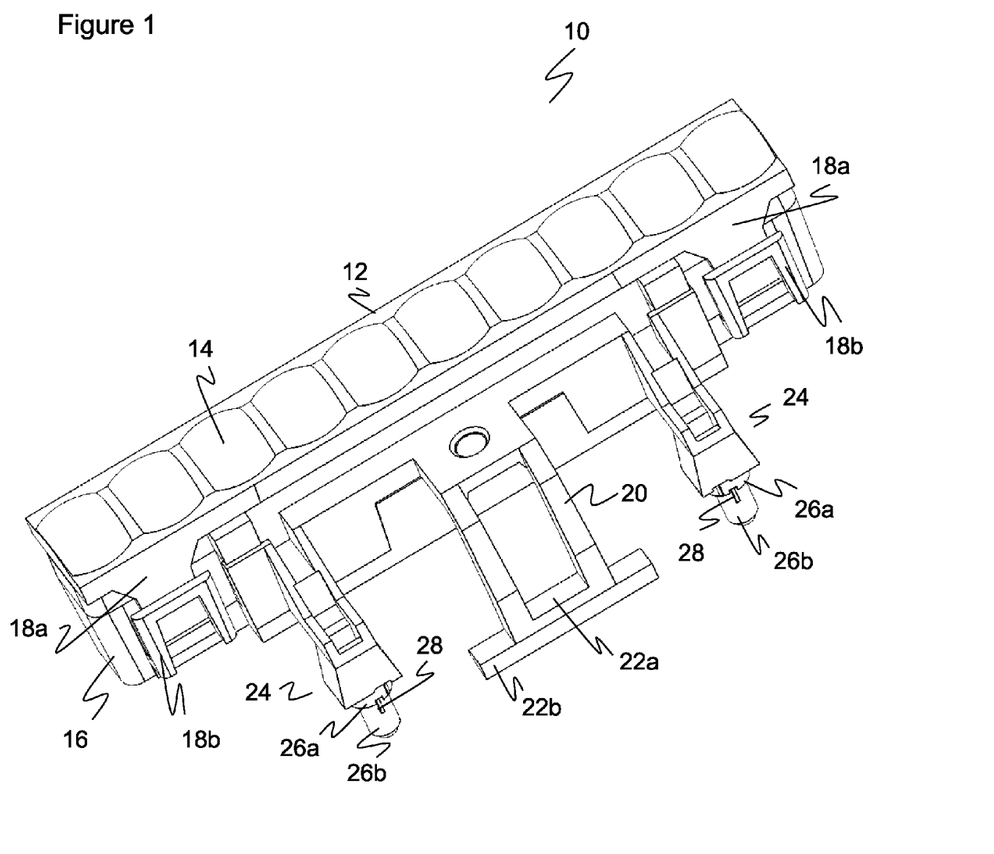
FIG. 1 a three-dimensional view of an optical module.
Figure 2:
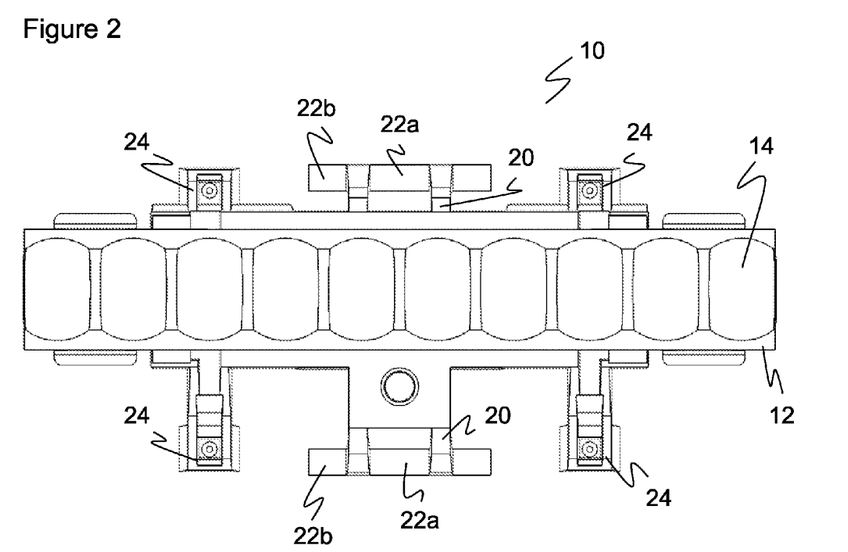
FIG. 2 a top view of the module in accordance with FIG. 1.
Figure 3:
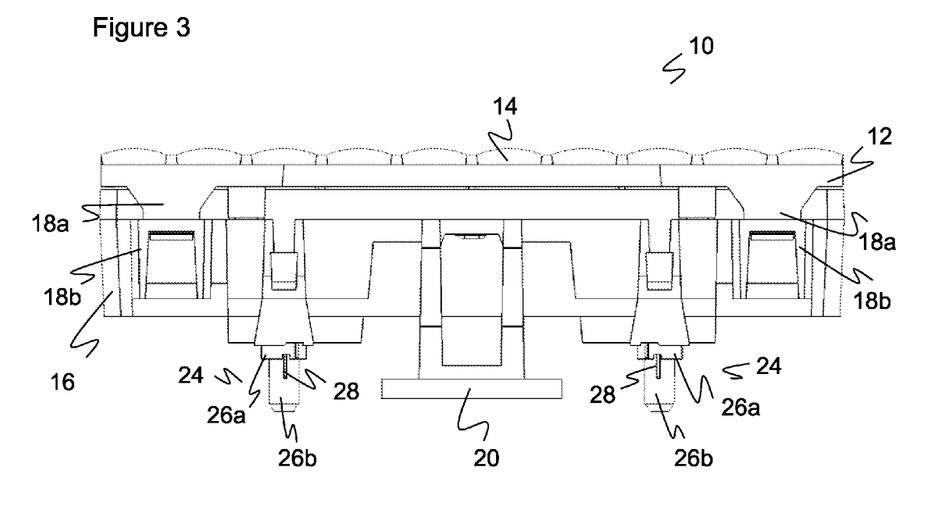
FIG. 3 a side view of the module in accordance with FIG. 1.

The FIGS. 1 to 3 show an optical module 10 in a three-dimensional view, top view and side view. The optical module 10 comprises an array of lenses 12 having a plurality of lenses 14 and an array 16 of lens tubes having a corresponding plurality of lens tubes substantially covered due to the illustration. The invention is in any event not limited to a certain design of the lens tubes. Ten lenses 14 and associated lens tubes are provided in the illustrated module 10, thus ten light beams 110 can thereby be transmitted or received. This number is selected purely by way of example, optical modules 10 having a lens 14, two lenses 14 or any other number of lenses 14 are plausible. Moreover, the number of optical modules 10 can be increased by a sequential arrangement, for example, in order to assemble a light grid 100 of certain length and with a certain beam spacing.

The array of lenses 12 is snapped to the array 16 of lens tubes via snap-on connections 18a-b. Through this two-part assembly the array of lenses 10 and the array 16 of lens tubes can be manufactured separately and combined in a simple manner. Alternatively, it is plausible to use an optical module 10 only having an array of lenses 12 without an array of lens tubes 16 or to fixedly connect the array of lenses 12 to the array of lens tubes 16, for example, by means of the manufacture as a two-component injection molded part.

The optical module 10 comprises two clamping brackets or retainer brackets 20 which are arranged opposite one another. A deviating number of retainer brackets 20, as well as their displaced arrangement are also likewise plausible. The retainer brackets 20 have a first support surface 22a and a second support surface 22b at different heights and in this way at different spacings with respect to the lenses 14. In this connection, the spacing relates to the z-direction in parallel to the optical axes of the lenses 14.

The optical module 10 further comprises four stubs 24. The stubs 24 have a first part region 26a and a second part region 26b which are respectively configured as cylinders of different diameter. Thereby, support regions arise at the transition between the two part regions 26a-b, as well as at the upper end of the first part region 26a whose spacing amongst one another precisely corresponds to the difference in height between the support surfaces 22a-b of the retainer brackets 20. Again, the number of the stubs 24 should be understood purely by way of example. Also other kinds of shape are plausible, such as a polygon rather than a circle as a basic surface which leads to a prism-like stub 24 or to a change of the cross-sectional area with the height such as for a cone. The stubs 24 can moreover be optionally be provided with displacement ribs 28, wherein their shape and number is likewise variable.

Figure 4:
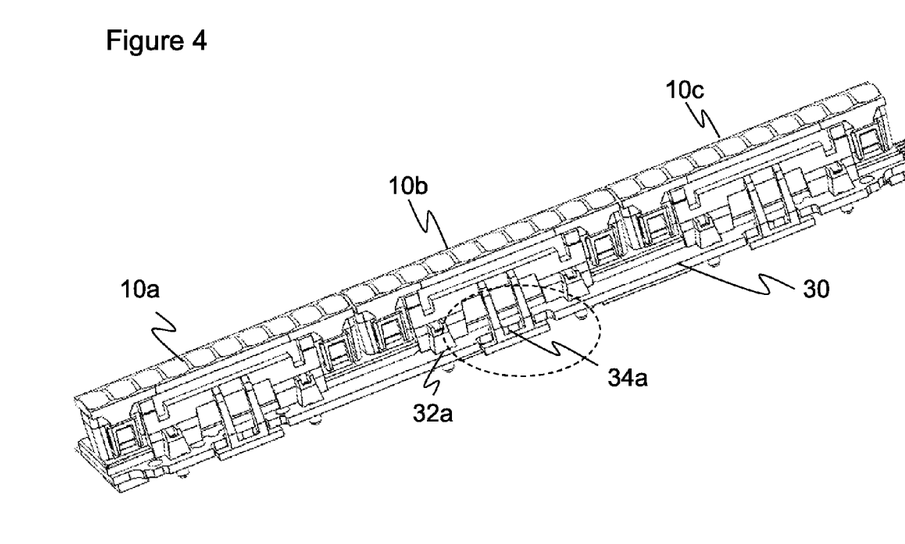
FIG. 4 a three-dimensional view of an arrangement of an optical module in accordance with FIG. 1 fastened at a first spacing to a circuit board.

FIG. 4 shows a three-dimensional view of an arrangement of three such optical modules 10a-c which are fastened to a carrier 30. The fastening in FIG. 4 takes place such that a first spacing of the lenses 14 is set. The FIG. 6 explained in the following shows, a further example of a fastening at a larger second spacing of the lens 14. The carrier 30 in FIG. 4 is, for example, a circuit board with light receivers 108, such that the functional core of a reception unit 106 of a light grid 100 in the present instance with thirty light beams 110 arises. The use of the optical module 10 is, however, not limited to circuit boards for light grids 100, but rather the carrier 30 can also be a different component, for example of plastic, metal or ceramic in a different application.

Figure 5A:
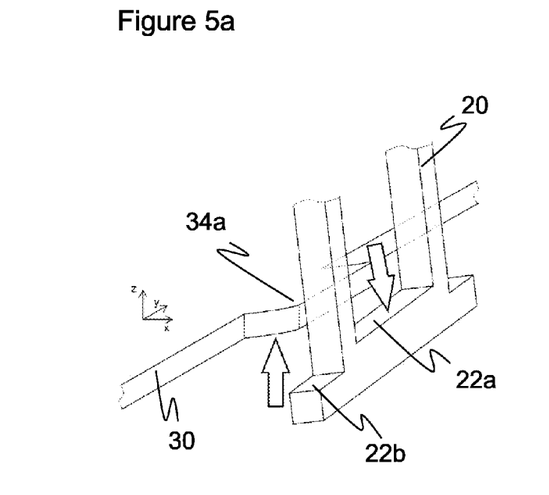
FIGS. 5*a-b* detailed views of the fastening of an optical module to a circuit board at a first spacing.
Figure 5B:
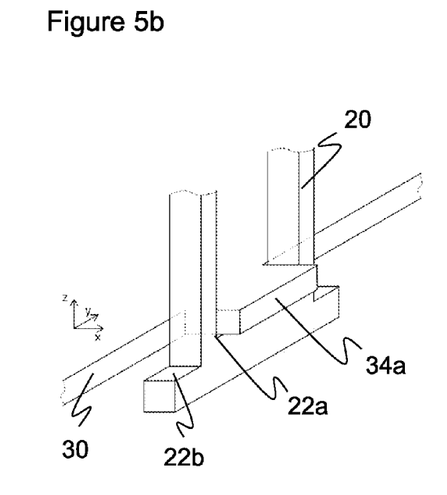

The fastening of an optical module 10a-c at the carrier 30 in the first spacing will now be explained by means of a detailed view in accordance with FIG. 5a-b of the section characterized with a circle in FIG. 4. As illustrated in FIG. 5a the retainer brackets 20 are outwardly moved, preferably mechanically moved, and a carrier 30 is inserted, such that the stubs 24 project into bore holes 32a of the carrier 30.

The bore holes 32a are dimensioned so large that both part regions 26a-b of the stubs 24 can penetrate and that the stub first contacts at the upper transition of the first part region 26a at the carrier 30. The displacement ribs 28 ensure a connection without clearance in the lateral x-y-directions perpendicular to the optical axes of the lenses 14.

The carrier 30 has cutouts 34a at its outer edge, the cutouts being dimensioned in such a way that a seat at the first support surface 22a is enabled. In order to now move the retainer brackets 20 into their final position a force is exerted on the retainer bracket 20 and/or the carrier 30 which is symbolized in FIG. 5a by arrows. Once, the fastening position in accordance with FIG. 5b has been achieved the outer force is no longer maintained and a connection free of clearance results. The supports of the cutouts 34a at the first support surface 22a and the transition between the first part region 26a and the second part region 26b correspond to one another at that height and each set the desired first spacing of the lens 14 with respect to the carrier and the receivers, for example, present there. The retainer brackets 20 are preferably designed with undersize and in the installed state are biased in order to ensure a connection in the z-direction without clearance. Additionally, the thickness tolerance of the electronic card can be compensated thereby. Moreover, the retainer brackets 20 are preferably configured by means of their geometry or their surface properties, such that they cannot slide of the carrier 30 in the assembled state.

Figure 6:
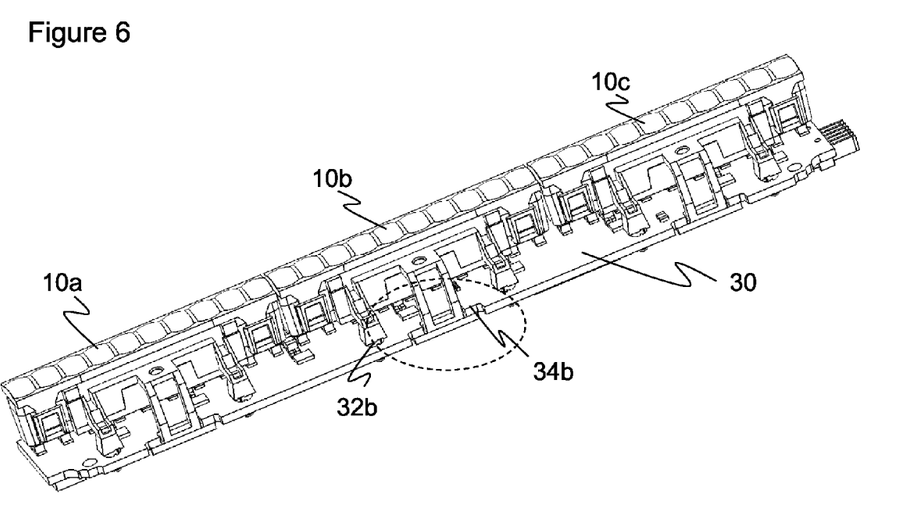
FIG. 6 a three-dimensional view of an arrangement of an optical module in accordance with FIG. 1 fastened at a second spacing to a circuit board.

FIG. 6 shows a three-dimensional view of an arrangement of three optical modules 10a-c which are fastened to a carrier 30. In contrast to FIG. 4 the attachment in this instance takes place, such that a second spacing of the lens 14 is set. In this connection, the carrier 30 differs from that in accordance with FIG. 4, but not that of the module 10a-c which is configured in an identical manner and is still suitable for a fastening selectively at the first spacing or at the second spacing. The carrier 30 in this instance is, for example, a circuit board with light transmitters 104, such that the functional core of a transmission unit 102 of a light grid 100 arises.

Figure 7:
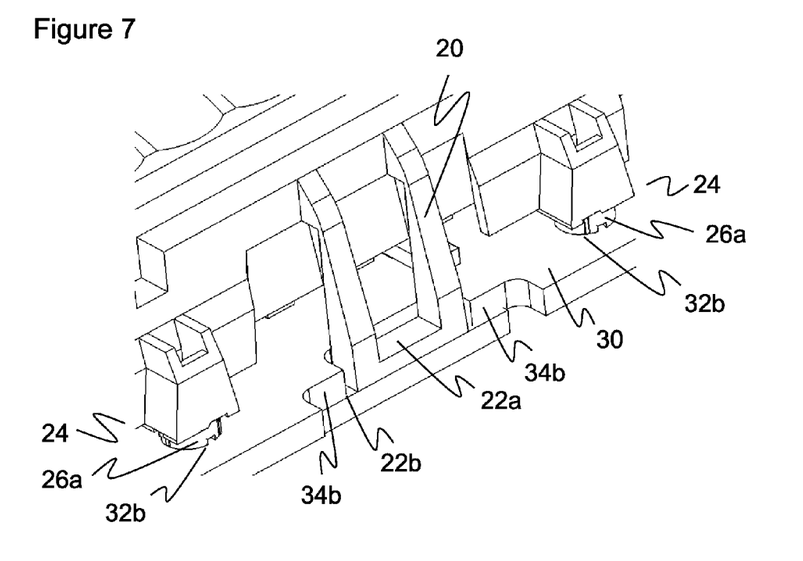
FIG. 7 a detailed view of the fastening of an optical module to a circuit board at the second spacing.

The fastening of the optical module 10 at the second spacing is illustrated in a detailed view in FIG. 7 which corresponds to the section referred to in the FIG. 6. The stubs 24 in this case only penetrate so deep into the bore holes 32b until the transition between the first part region 26a and the second part region 26b contacts the carrier 30. The wider first part region 26a no longer fits into the specifically so dimensioned bore hole 32b, such that the lenses 14 are held at the second spacing through a seat at the transition.

Correspondingly, also cutouts 34b of the carrier 30 are of different design than in the example of the FIG. 4, namely such that the cutouts 34b contact at the second support surface 22b. The lenses 14 are thus held at the second spacing by the retainer brackets 20. The second spacing is supported by the stubs 24 as described, wherein embodiments are also plausible in which the stubs 24 do not determine the spacing again or can be omitted completely, wherein then the fixing in the x-y-direction is ensured in a different manner.

Thus, the identical optical module 10 provides the possibility of setting two different spacings of the lens 14. For this purpose, the carriers 30 are provided with the matching bore holes 32a-b and cutouts 34a-b at the desired spacing. It is also plausible to make available both fastening possibilities at a carrier 30 and to select these during the assembly.

The selectable spacing can, in particular be used in order to independently set the spacing of the lenses 14 for the transmission elements and for the reception elements. In this way, one and the same optical module can be used at the transmission side and at the receiver side. By means of a special operating medium which simultaneously connects a row of the optical modules 10 to the carrier 30, also long arrangements, such as transmission units 102 or receiver units 106 can be manufactured quickly during the manufacture. It is also plausible to only use optical modules 10 in a light grid 100 at the transmission side or only at the receiver side and to omit these at the side disposed opposite thereto. Thereby, variants with better cross-beam properties or lower manufacturing costs can be created. Furthermore, in accordance with the described principle for fastening an optical module 10 at one of two selectable spacings, it is also plausible to state the construction of the optical module 10 and of the carrier 30 with which more than two spacings can be achieved by the same optical module 10.

What is claimed is:

1. An optical module comprising at least one beam-forming element and at least two retainer brackets for fastening the optical module to a carrier, wherein each retainer bracket has a first support surface and a second support surface, the first support surface being parallel to and vertically displaced from the second support surface in order to selectively fasten the optical module at the first support surface or at the second support surface at the carrier.

2. The optical module in accordance with claim 1, wherein the carrier is a circuit board.

3. The optical module in accordance with claim 1, wherein the retainer brackets are formed with undersize and are introduced into their holding position under the influence of a force in order to overcome the missing size.

4. The optical module in accordance with claim 1, comprising a plurality of stubs in order to determine the lateral position of the optical module at the carrier through an engagement in corresponding recesses of the carrier.

5. The optical module in accordance with claim 4, wherein the stubs have a first part region and a second part region and the engagement into the recess is determined by the part regions on a fastening of the optical module at the first support surface and at the second support surface.

6. The optical module in accordance with claim 1, which comprises at least one lens tube.

7. The optical module in accordance with claim 6, wherein at least one of the beam-forming elements and the lens tube are connected to one another in a releasable manner.

8. The optical module in accordance with claim 1, whose beam-forming elements form an array of lenses.

9. An arrangement of a carrier and an optical module comprising at least one beam-forming element and at least two retainer brackets, wherein each retainer bracket has a first support surface and a second support surface, the first support surface being parallel to and vertically displaced from the second support surface in order to selectively fasten the optical module at the first support surface or at the second support surface at the carrier, the carrier having at least one support section at which the first support surface of the retainer bracket is supported or having at least one support section at which the second support surface of the retainer bracket is supported.

10. The arrangement in accordance with claim 9, wherein the carrier has a plurality of recesses which are configured for the engagement of the first part region of a stub or which are each configured for the engagement of the second part region of a stub.

11. The arrangement in accordance with claim 9, wherein the carrier has at least one light transmitter or at least one light receiver.

12. A light barrier or a light grid having at least one arrangement of a carrier and an optical module comprising at least one beam-forming element and at least two retainer brackets, wherein each retainer bracket has a first support surface and a second support surface, the first support surface being parallel to and vertically displaced from the second support surface in order to selectively fasten the optical module at the first support surface or at the second support surface at the carrier, the carrier having at least one support section at which the first support surface of the retainer bracket is supported or having at least one support section at which the second support surface of the retainer bracket is supported.

13. A method for the manufacture of an optoelectronic sensor in which at least two retainer brackets of an optical module having at least one beam-forming element are bent apart, a carrier is inserted; and a load is removed again from the holding brackets or the holding brackets are compressed in order to fasten the optical module to the carrier, wherein,
selectively, a first support surface of the optical module is brought into engagement with support sections of the carrier at a first support surface or a second support surface is brought into engagement into engagement with support sections of the carrier at the second support surface, with the first support surface being parallel to and vertically displaced from the second support surface, such that at the same time the first support surface or the second spacing is set between the beam forming element and the carrier on fastening of the optical module to the carrier.

14. The method in accordance with claim 13, wherein stubs of the optical module are guided in recesses of the carrier for determining the lateral position of the optical module at the carrier, wherein selectively a first part region of the stub or a second part region of the stub engages into recesses configured corresponding to the first part region or corresponding to the second part region and the first support surface or the second support surface is thereby set again.

15. An optical module comprising at least one beam-forming element and at least two retainer brackets for fastening the optical module to a carrier, wherein each retainer bracket has a first support surface and a second support surface, the first support surface being parallel to and vertically displaced from the second support surface to form a defined space between the first support surface and the second support surface in order to selectively fasten the optical module at the first support surface or at the second support surface at the carrier.

* * * * *